(12) United States Patent
St. Louis

(10) Patent No.: US 9,116,667 B1
(45) Date of Patent: Aug. 25, 2015

(54) WEARABLE DISPLAY SYSTEM HAVING REMOVABLE OLED DISPLAY

(71) Applicant: Widny St. Louis, Miramar, FL (US)

(72) Inventor: Widny St. Louis, Miramar, FL (US)

(*) Notice: Subject to any disclaimer, the term of this patent is extended or adjusted under 35 U.S.C. 154(b) by 86 days.

(21) Appl. No.: 14/088,568

(22) Filed: Nov. 25, 2013

Related U.S. Application Data

(60) Provisional application No. 61/730,304, filed on Nov. 27, 2012.

(51) Int. Cl.
*G06F 1/16* (2006.01)
*H04W 4/00* (2009.01)

(52) U.S. Cl.
CPC .............. *G06F 1/163* (2013.01); *H04W 4/008* (2013.01)

(58) Field of Classification Search
CPC ................................ A41D 27/085; D06Q 1/00
See application file for complete search history.

(56) References Cited

U.S. PATENT DOCUMENTS

| | | | |
|---|---|---|---|
| 6,282,760 B1* | 9/2001 | Mars | 24/303 |
| 2001/0043164 A1* | 11/2001 | Thagard et al. | 345/7 |
| 2003/0090598 A1* | 5/2003 | Johngren et al. | 348/838 |
| 2006/0007059 A1* | 1/2006 | Bell | 345/55 |
| 2010/0226117 A1* | 9/2010 | Krans et al. | 362/97.1 |
| 2012/0204307 A1* | 8/2012 | De Mattei et al. | 2/69 |

* cited by examiner

*Primary Examiner* — David Bilodeau
(74) *Attorney, Agent, or Firm* — H. John Rizvi; Gold & Rizvi P.A.

(57) ABSTRACT

A wearable display system comprises a garment and a removable flexible display. The garment includes a retaining means for the display, which, according to the habit of wearing a particular garment, may involve magnetic or mechanical retaining means, or both. The retaining means allows of usual washing of the garment and may be so selected as to anticipate vigorous activity, colder weather, rapid update of the display for purposes of public information and other factors that might relate particular uses of a publicly-visible garment to the level of stresses created between the garment and the display in a particular use. The user may update the display actively, by connecting a source of image information to a USB interface supplying the display through a processor or passively, through a network-enabled SPI port module substituted in favor of the USB port.

19 Claims, 8 Drawing Sheets

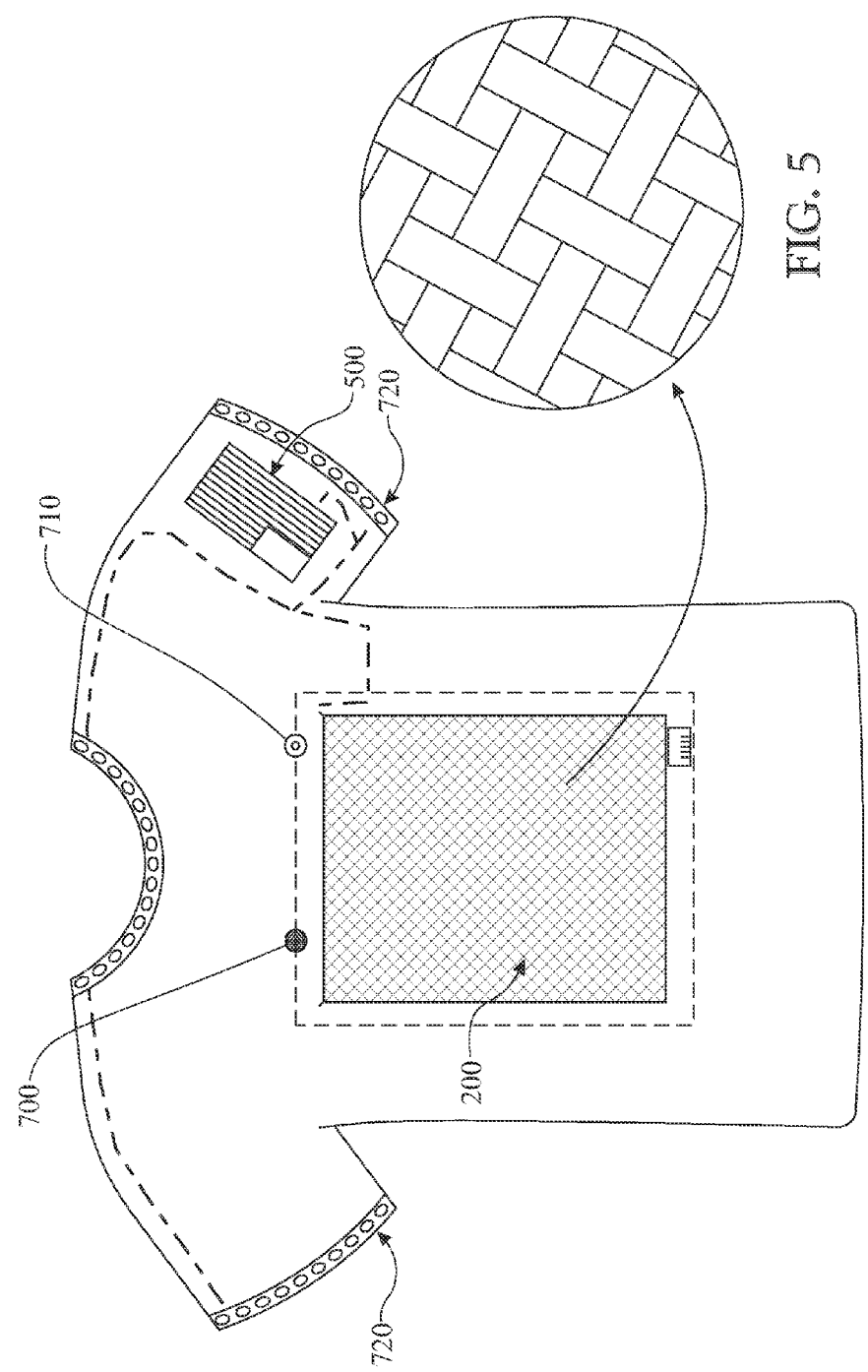

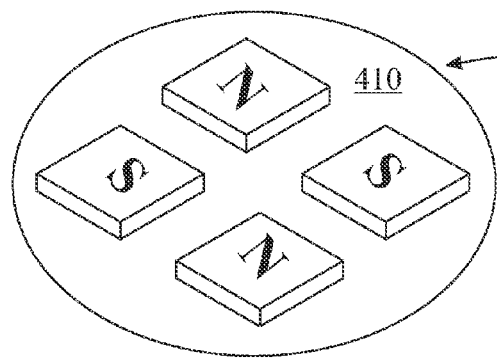
FIG. 10B
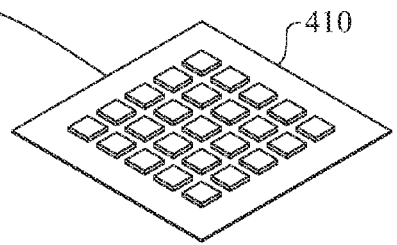
FIG. 10A
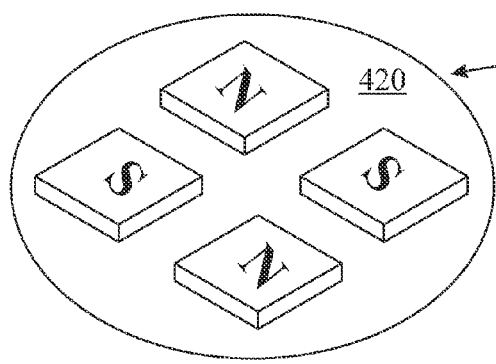
FIG. 10C
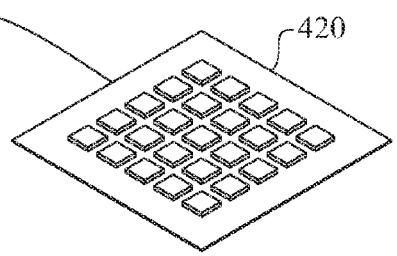
FIG. 10D

WEARABLE DISPLAY SYSTEM HAVING REMOVABLE OLED DISPLAY

FIELD OF THE INVENTION

The present invention relates to a wearable electronic display system and method of use, and more particularly a garment having an OLED-type display, which enables an interface configuration for direct or network updateable access for use during wearing of the garment.

BACKGROUND OF THE INVENTION

Updateable displays for signs are commonly known having a display area onto which an image can be program ably displayed. Similarly removable emblems and the like for fabrics such as garments are known. The purpose of signs and emblems is normally fixed and consequently few efforts are directed to rendering such indicators programmable or as part of a wider-purpose platform, unless in the former case a sign is intended as reliably fixed in a spot to give information such as the name of a movie currently showing or a live ticker feed of stock information. In such cases the platform is usually a public or commercial machine, with no attempt to either express personal input or make use of individual activity to convey the medium. Likewise in the latter case flags or slogans are often permanently sewn to a shirt, intended to reflect the preferences of the wearer and unlikely to change at least for the lifetime of the garment.

The present invention is directed to adapting garment emblems for purposes of more specific communication, or in other aspects to place the vast capabilities of digital display technology at the disposal of consumers and merchants for an expanded integration of digital information-flow in the activities of everyday life.

When a consumer dons a T-shirt with a message, they typically are constrained either, to display a logo designed by a corporation to promote the commercial interests thereof, or some bon mot which they and their close friends will soon tire of reading. Similarly public officials like traffic police officer's wear a shirt or jacket vaguely conveying the nature of their employ, and expend energy in endless display of semaphores and gestures which hopefully will be noticed and obeyed in time to avert calamity.

Similarly the numerical identity of an athlete, including team membership and perhaps name, is wedded to a piece of fabric which at times unnecessarily limits choices of import to the objects of the game, as further described in detail below. Other examples may readily be found in which information displayed on one's person may play a role in daily activity, especially in a world of increasing density. The prior art contains numerous examples in which inventors have endeavored without success to solve these problems, or provided solutions which, though adequate to address the problems of the day, do not extend far enough to cover such problems as have accompanied the increasing stress, speed and crowding of today's world. These days' people may be less inclined to interact casually with other people around them, being involved in cell phone conversations or mobile network interactions and the like.

For example, U.S. Pat. No. 7,030,855, to Metcalf is directed towards a contiguous video imaging surface, which perhaps is best suited to military camouflage applications in which the camouflage must be updated continuously to reflect changing surroundings. As such it concentrates on covering as much of the garment area as possible with a natural looking display, and distracts from the present goals of hygiene, rapid attachment and detachment, and other important considerations as outlined below.

A further example of the prior art, U.S. Pat. No. 7,787,240 to Swain is a jacket which adds the electronic and wireless burden of GPS for use in advertising goods and services, particularly at venues where people are gathered but lacks embodiments to allow the displayed messages to be targeted to the specific interests of those gathered at a particular event or to anticipate active wear and the rigors thereof.

Yet another example of the prior art, U.S. Pat. No. 4,766,295 to Davis shows a very simple system of wireless displays which cannot be worn. Accordingly, there remains a need in the art for a rapidly affixable and removable flexible display that enables full wearability and hygienic functionality, while also enhancing an information experience integrable into the rigors of everyday activity.

SUMMARY OF THE INVENTION

In a preferred embodiment of the present invention, a combination of a flexible magnetized backing sheet or a fabric-rimmed hole with mechanical fastening means, or a sewn-on group of up to four main fabric flaps serves to retain the display substantially integral with the garment during normal or enhanced activity.

Mechanical fastening means (dome fasteners, velcro, zippers, buttons or the like) may in some embodiments of the invention provide ideal retaining means for a thin, lightweight, flexible display attached to a garment. Especially in cases where the garment is not intended for use without the display and the garment is not of such an irreplaceable nature that forbids modification, the existence of a large hole made to accommodate the display will not impose on the wearer. The garment remains washable with electronics removed.

In cases where the garment is, for example, too expensive to accommodate a hole, the system of the present invention may be more advantageously embodied through the use of a flexible magnetized backing sheet. The sheet comprises a magnetic system for retaining the OLED display or metallic such elements engaging magnetic elements, or a mixture of the two alternatives so chosen to achieve an ergonomic balance having natural body motion as expected for a garment, as further described in detail below.

In keeping with other expected properties of a garment, the invention is so crafted as to minimize imposition of the flexible OLED display and other elements on expected behavior of the garment during passive wear, such as relaxing, reading or watching TV and also during mixed wear characterized neither especially by motion nor inactivity of the body, but by the need for the garment to follow the limited motions of the body properly to avoid such environmental obstacles as food, work-related hazards. (Cans of paint, moving machinery and the like)

The present invention overcomes the deficiencies of the known art and the problems that remain unsolved by providing a seamlessly integral wearable venue for the communication of remote-updateable or network-updateable visual information with substantially unnoticeable encroachment on the everyday activity of the wearer.

In accordance with a preferred embodiment, in an information processing system which is one aspect of the present disclosure of the present invention, the invention consists of a wearable display assembly comprising:

an OLED flexible display surface;

a retainer for seating the display comprising magnetic or mechanical holding means;

a digital electronics section for procuring and storing images and controlling the display accordingly further comprising:

a Processor section including a driver for retrieving from memory and displaying images, a memory connected to the processor for storing images or parts of images, a USB and/or SPI port connected to the processor which may accept images or information pertaining to stored images from external sources, such as a mobile terminal, wireless signal or PC.

In a second aspect, the processor is connected to the display and programmed to provide known functionality of a display driver, such as synchronization, screen refresh and active matrix control based on a source of image information such as memory.

In another aspect, memory storing image information to be displayed on the garment is SIM memory.

In another aspect, a USB port connected to the processor may receive information pertaining to an image to be displayed, up to and including a number of bits sufficient to determine the contents of the entire OLED display.

In another aspect, mechanical fasteners may be (dome fasteners, velcro, zippers, buttons or any other known fabric fastening system and may further involve such additional sewn on fabric means to assist in connecting to corresponding fasteners attached to the display.

In another aspect, the display retainer provides mechanical or magnetic fastening means in the form of a backing sheet, where the display and backing sheet may include magnetic materials or metallic magnet engaging means.

In another aspect, the metallic magnet engaging means may be combined with the mechanical fasteners and which may further involve holes cut in the garment, which holes may further be partially filled with modified fabric areas suitable for the combination.

In another aspect, the OLED flexible display assembly Processor section further comprises an image generator consisting of at least one stored image and display driver circuitry to accept information pertaining to images to be displayed. It is to be understood that digital elements are to be constructed of surface mount or other highly compact digital circuitry as is known to the art. Information pertaining to images to be displayed may be wirelessly broadcast on a LAN, WLAN or WPAN via a Bluetooth or 802.11-based protocol such as, for example, Zigbee. Zigbee modules such as are made by, for example, STMicroelectronics are available at modest cost and may be made to communicate with a processor via a SPI port in the present invention, and programmed to operate in accordance with the present invention in a manner known to skilled practitioners of the art.

In a highly preferred embodiment information pertaining to images to be displayed may be supplied to a USB port connected to the display through the processor and images may be loaded into the processor from a computing device through a USB port connection. In some preferred embodiments stored images may represent ASCII characters, logos, or any other type of monochrome or multicolor information that might be of sufficient resolution to provide useful information for the multitude of uses listed herein, and which also may be updated quickly enough through a SPI port in place of the USB port according to the wireless capabilities available in any particular such use, according to tradeoffs of bandwidth versus image resolution and update speed, as are known to persons of skill in the art.

In another aspect, the image generator consisting of stored images in digital circuitry and display driver circuitry to accept information pertaining to images to be displayed may be integral with a commercially-available device, such as a mobile terminal. The mobile terminal may be network-enabled and may have the capability to drive an external display through a wired port or wireless interface. The OLED flexible display may further comprise digital circuitry to accept a driving signal from the wired port or wireless interface or infra-red interface of the mobile terminal.

In another aspect, optional other connected, associated LED display areas may be connected to the processor.

In another aspect, optional hood-rimming or cuff-rimming LED display areas may be connected to the processor.

In another aspect, the two regions which may be required to exhibit magnetic properties, namely the backing sheet and the display or regions rigidly fixed to the display (for example, a frame) are given magnetic properties by virtue of fine particulate matter mixed into the material at time of manufacture, wherein such particulate matter possesses magnetic properties exhibiting hysteresis under certain known conditions which may be created during a later step of manufacture, and wherein such conditions include the application of an external magnetic field, and wherein such conditions are devised to create corresponding regions of permanent or semi-permanent magnetic field so chosen as to create the functional effects as outlined below such as, for example, rapid and accurate alignability by unskilled users.

In another aspect, the magnetic properties respectively imparted through methods of manufacture to the display module and the magnetic sheet backing module comprise a mixed magnetic relationship in which magnetic regions of opposing polarity are so aligned in the two modules that, when being introduced into each other's respective regions of significant field strength, the regions guide a user in placing the modules together in such a manner as to maximize mutual attraction and efficient alignment, wherein efficiency is understood to mean that no overlap of either module is necessary with respect to the garment, to advantageously ensure that structural and magnetic properties best support each other. In such a way, maximal ideal orientation of the display is achieved and rigidly maintained. (Within, as much as possible, the guidelines expected for a garment) 'Ideal orientation' in this sense is understood to refer to beneficial viewing by the intended audience, particularly with regard to words to be read.

In another aspect, garments subject either to amplified movement or reduced attraction as, for example, sports activities outlined below may require stronger magnetic fields during manufacture to be effective. Similar arguments apply to cases in which the magnetic attraction is caused by discrete elements, as opposed to magnetizeable particulate suspensions.

In another aspect, the magnetic sheet allows for washing in order that it may be maintained in a hygienic state, even if used by multiple wearers. The mechanical retaining means likewise permits washing once the detachable display and optional other hardware has been removed.

Moreover, the present disclosure may be a method, system, information processing device or a program recorded on a recording medium which is read by a computer or other device or machine. Here, the memory or recording medium which is read by the computer, or the like, is a recording medium on which information such as data or a program is stored by an electrical, magnetic, optical, mechanical or chemical action, and from which information is read by a computer, or the like.

For example, one aspect of the present disclosure is an information processing method executed by each of a plurality of information processing devices included in an information processing system, the respective information processing devices carrying out tasks as described herein.

Introducing another embodiment, a method of use includes the steps of:

outfitting two teams into a garment with programmable display assembly;

determining the level of equality of the two teams by observing some duration of pre-game play, sufficient for coaches or other knowledgeable observers, to form a determination on the basis of the observation;

updating the OLED displays of the team jerseys on each player to reflect an agreed team distribution which matches the two team teams most equitably;

directing the playing members of the two teams to examine their jersey displays and switch sides as necessary;

resuming pre-game play if desired to reiterate, beginning from the foregoing step of 'determining'; and commencing play with jersey displays set as last updated, in the event that equality of teams is agreed by said observers as satisfactory, and further iteration is thus not desired.

In another aspect, the method further comprises steps of:

incorporating further display information pertaining to sponsors of said teams or personal information pertaining to the team players and their historical performance, or similar information desired to be observed by game spectators during a real live game, or desired to be directed at game spectators by sponsors, or public health or safety information in the event of a need to evacuate because of an emergency, impending game suspension due to weather, special offers or the like, into said OLED display or a portion or adjunct thereof; and updating said further display information as appropriate depending on the content thereof.

In another aspect, the method further comprises steps of:

as worn by persons in a structured environment such as, for example, a secure government facility, substantially clearing image information content of a display, or otherwise contriving to present a default "all clear" image; under normal conditions as described above, displaying specific information under certain conditions, other than normal conditions, to allow or disallow access of the wearer to certain safe areas, or to direct all who might view the display under certain other conditions of a security emergency to specific remedial action to be taken by the viewers, such as for example lockdown procedures.

Introducing another embodiment, in a method of use for the wearable display of the present invention, a customer wearing a T-shirt according to the invention decides to spend a day with her friends from out of town. In the morning, customer goes to exercise with friends. She can upload the screen to the shirt and download an app that will be able to sense and beautifully display her heart-beat and how many calories she has burned on her shirt. By mid-morning she puts the same screen on a different t-shirt to go shopping with friends. She uploads a beautiful floral design on screen an image or content. After an hour while she is out with friends, she decides she wants to change the display to animated Disney® characters moving around in the screen. In the afternoon, customer changes her shirt and attaches the screen with an image she custom made herself on the inventor's website using graphic design tools. Later that night, they go to a Coldplay® concert. She puts on a sweater and attaches the same screen on the sweater with the image of Coldplay® pictures. After concert, they go to a restaurant and her shirt displays pictures of her friends at the Coldplay® concert which was taken by her phone camera. After midnight, they join the Occupy Wall Street® protest and her shirt now boldly reads "We are the 99%."

The customer can browse, purchase, store, and access these images or apps with their mobile phones, e-pads, and website by accessing their media file which is similar to iTunes® or Windows Media Player.

In some embodiments the present invention may have its own operating system and graphic user interface. A graphic card therefor is able to provide high graphic quality.

In some embodiments the present invention may have a software developers kit (SDK) to enable users to create apps or content. In some embodiments the present invention may provide graphic design and art tools for graphic designers and artists to create and post content on a website for customers to purchase.

The shirts and other garments (t-shirts, jerseys, sweaters, polo shirts, etc.) may be made available separately to customers for low-cost, say approximately $5.00. The display screen may also be made available separately to customers for low-cost, and the apps and content that will be downloaded on t-shirt to customers may be made available for approximately $5-$10. Perhaps there could be a flash drive with the images on there that connects to the USB port.

In another aspect, the particulate magnetizeable particles may further comprise a highly-magnetizeable material. In certain sports, such as for example tennis, players tend to wear oversize shirts the better to maximize airflow during periods involving extreme exertion. Any mass affixed to such a garment will of necessity exhibit greater freedom of movement and thus accumulate sufficient momentum to overcome magnetic attraction, thus causing a playing and spectating disaster.

In another aspect, the display retaining assembly may comprise either mechanical or magnetic retaining means, or both. Persons in colder weather or involved in activities not subject to excess exertion as outlined above, may wear thicker garments which correspondingly act to reduce effectiveness of the magnetic attraction.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 4 illustrates the shirt as originally introduced in FIG. 1, illustrating a preferred embodiment for display retention under conditions of active wear.

FIG. 5 presents a view of an embodiment of the apparatus of FIG. 1 showing multiple magnetic regions having a preferred alignment;

FIGS. 10A and 10D show opposing Magnetic Surfaces A and B which are laid out in opposite configuration to align and attract. FIGS. 10B and 10C show details of magnetic polarity distribution and alignment of each opposing magnetic surface.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A wearable display assembly 100 is presented in various configurations in the illustrations of FIGS. 1 through 10.

Figure 1:
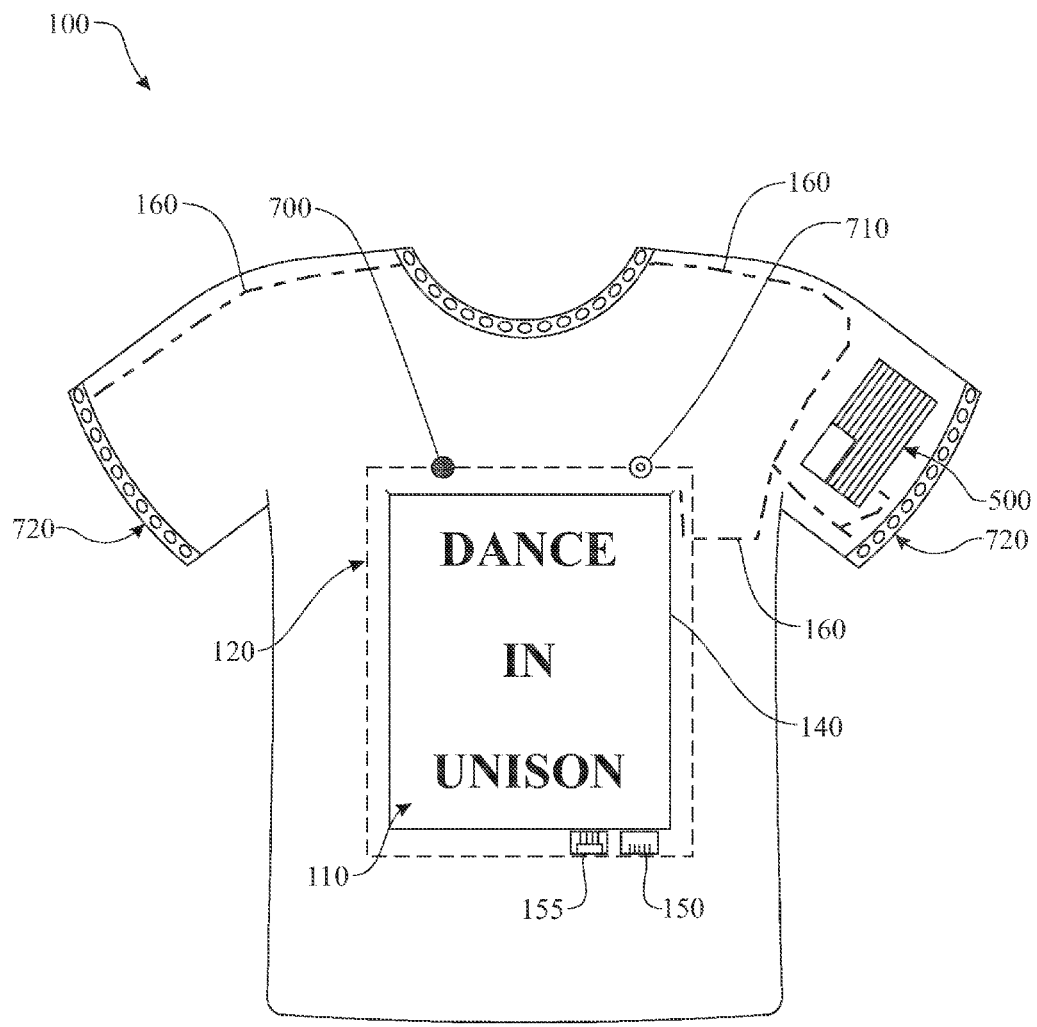
FIG. 1 presents a front view of an exemplary wearable garment assembly in accordance with the present invention.

As shown in FIG. 1, the garment with programmable display assembly 100 includes an OLED flexible display 110, mounting arrangement 120 and a fastening arrangement 140 which could be a fabric-rimmed receiving area or hole with snaps or a magnetic element as further described below in connection with FIG. 5 or an inventive combination. The display 110 comprises a flexible OLED display screen, and a processor 130 and memory 170 shown in exploded view in FIG. 2. In addition, as shown in FIG. 1, the garment can be further provided with a microphone/speaker 700 of lightweight construction, used in combination with a miniature lightweight camera 710. Also a removable flag emblem 500 on the shoulder sleeve is used that is interchangeable.

Figure 2:
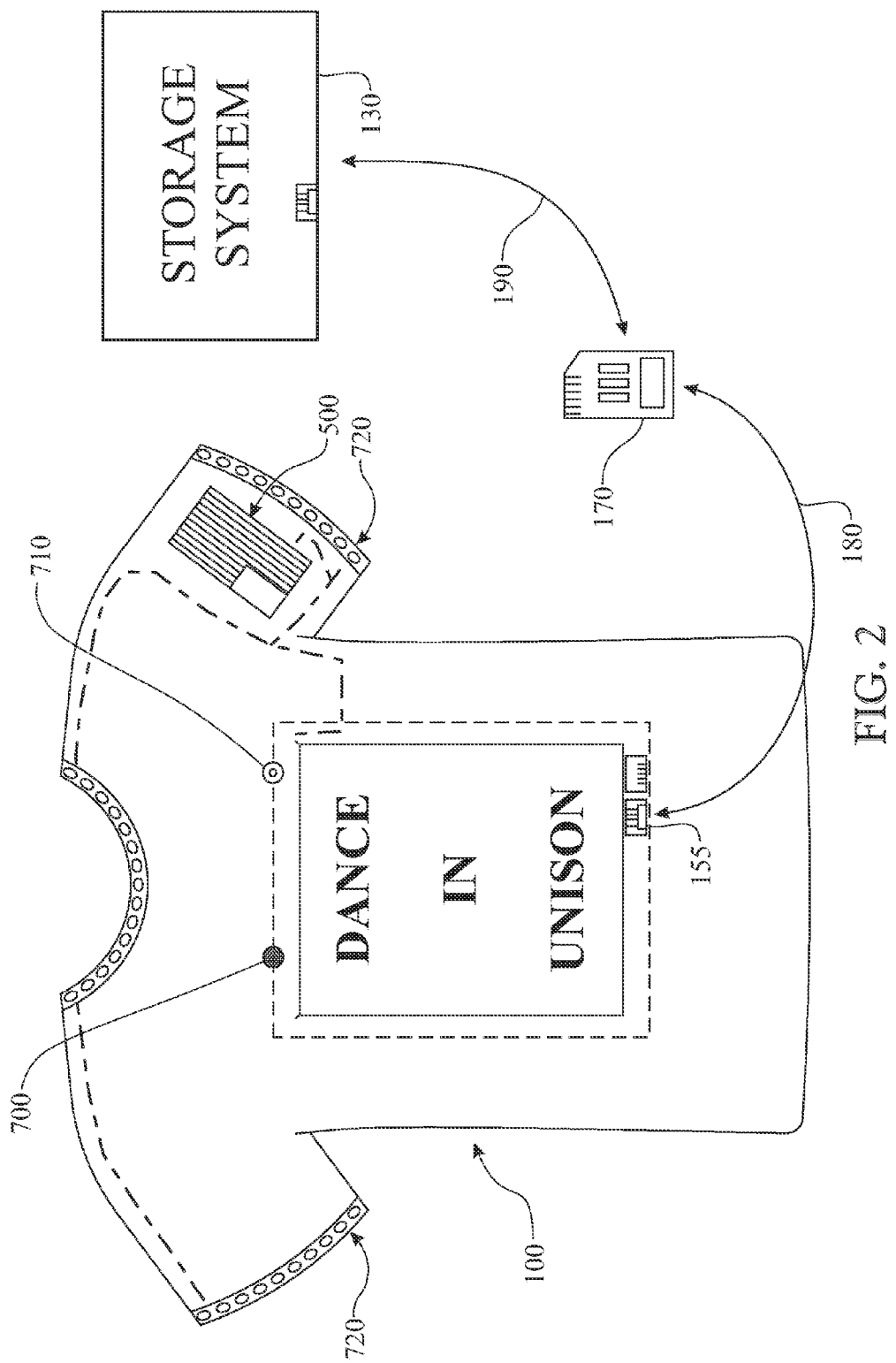
FIG. 2 presents a view of the shirt originally introduced in FIG. 1, illustrated as a system including additional apparatus for processing of the image to be displayed.

A mounting arrangement 120 with optional fastening means 140 is best shown in FIG. 1. The mounting arrangement 120 can be formed either as a magnetic means or a mechanical fastening means 140 (dome fasteners, Velcro, zippers or the like) or as some combination of magnetic and mechanical means. As explained above certain uses of the invention might make better use of magnetic means—for example garments too expensive to cut holes in—, or in the other extreme some uses might require mechanical means— for example in a case of active wear in which movement of the display means might overcome magnetic force—. It is understood that intermediate solutions might be found in which some fabric might be removed and some retained as, for example a strip, or a layer. In accordance with the present invention, all cases in which some fabric is removed would entail selection of some mechanical fastening means as at least part of the mounting arrangement. Cable 160 may be a USB cable as depicted in FIG. 2 as element 180, or it may connect to a SPI port (not shown). In use, the a USB port connection 150 with cable 160 serve to allow the user to select any image desired for display on the garment, FIG. 1.

The illustration of FIG. 2 shows details of the image procurement part of the system, including memory 170, which in a preferred embodiment is a single inline SIM memory. Also shown is cable 180 connecting to port 155 which may be a USB port as depicted in FIG. 1 as element 150 or it may be an SPI port. Processor 130 includes the necessary software to drive display 110.

Figure 3A:
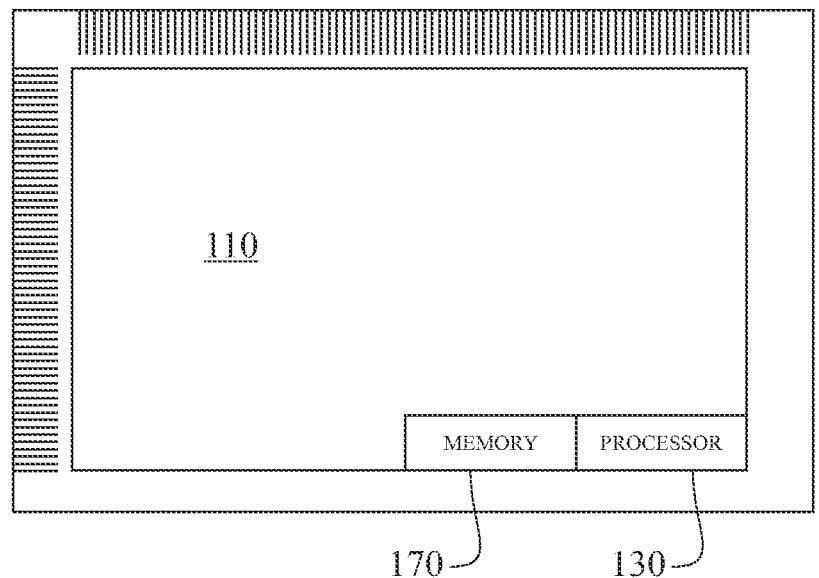
FIGS. 3A and 3B illustrate further the apparatus for processing originally introduced in FIG. 2.
Figure 3B:
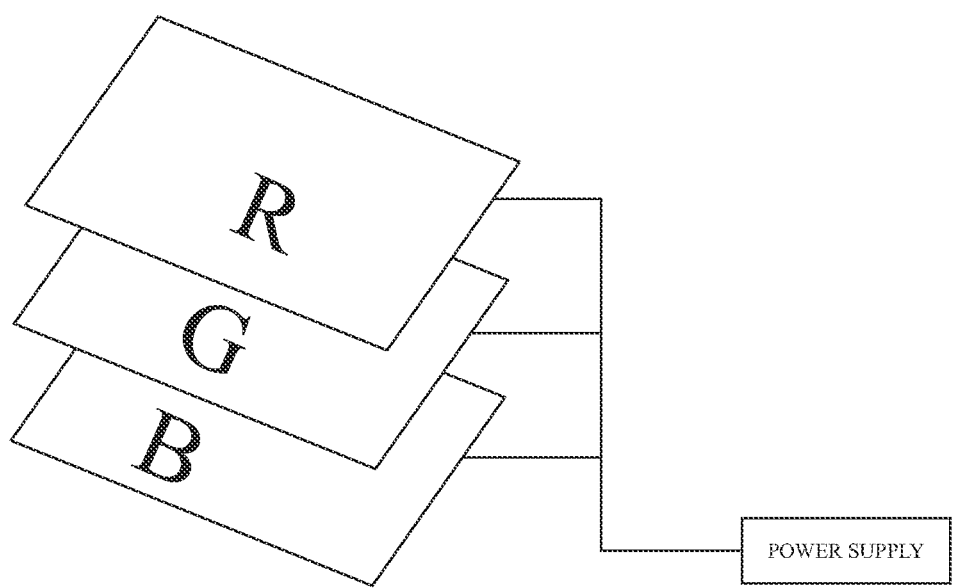

In turn, FIG. 3A shows display 110 as driven by processor 130, which is connected to, and receives image data from, the recording medium or memory 170.

The illustration of FIG. 4 shows a shirt with substantially rectangular hole 200.

In connection with FIG. 6, mounting arrangement 120 of FIG. 1 is embodied as a flexible magnetized backing sheet 300 which mates magnetically with the metal or magnetic regions 115 attached to the display or a pair of sheets of matched plural embedded permanent magnets 400 as further discussed below in connection with FIGS. 10A-D. The flexible magnetized backing sheet 300 of the present embodiment represents a pre-manufactured spatially continuous source of magnetic field into the retaining means of the mounting arrangement 120 for receiving and retaining a similarly modified OLED flexible display assembly 110. Magnetically-active regions 115, as shown in the figure, may occur, as shown, in the display frame 112 or in other areas attached to the display sheet.

Figure 6:
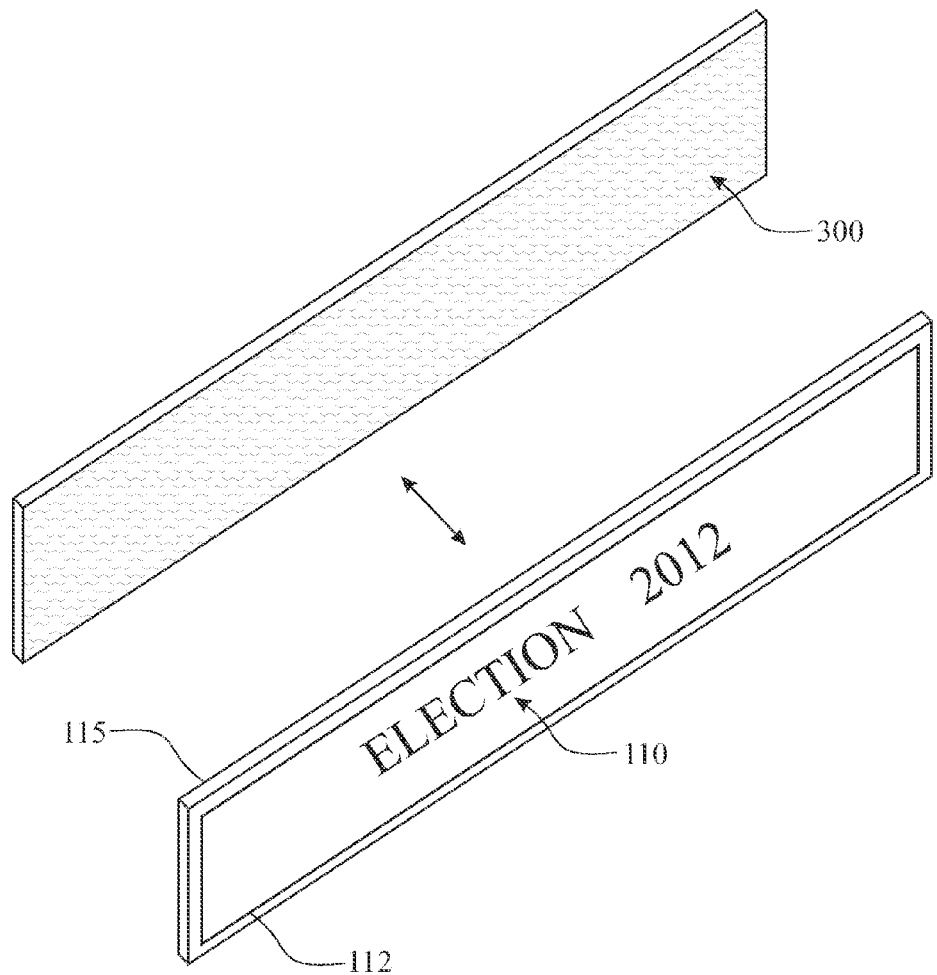
FIG. 6 represents a detail of FIG. 4, showing garment modifications supporting increased robustness when necessary for active wear.

In FIGS. 10 A-D, the sheet 400, which differs from 300 of FIG. 6 only in that embedded magnets are employed, comprises a first plurality of magnetic elements 410 disposed in such a way as to engage a second plurality of metallic members 420 having a relation substantially rigid with respect to the surface plane of a flexible OLED display 110. An alternative embodiment may substitute metallic such elements as the first plurality disposed to engage magnetic elements having as the second plurality, or a mixture of the two alternatives so chosen to achieve an ergonomic balance having as goal the least possible impediment to natural body motion as expected for a garment. A similar choice with respect to partial rigidity in the plane perpendicular to the display serves to minimize interference with the flexing of the display normally expected to follow the deformations of the garment during active wear. The OLED display may be chosen in such a way that the parts of the display may be more or less integral with a member defining their form and in some embodiments the form-defining member may actually be part of the garment. It is to be understood that elements 300 and 400 are substitutes and represent opposite extremes in a range of continuous choices, so chosen according to the purpose of the garment. Likewise it is to be understood that the magnetic retention effected by elements 115 and 300 substitutes that effected by 410 and 420. For purposes of the present invention "magnetic retaining means" is taken to include a non-limiting continuum of such choices.

FIG. 5 presents a detail of FIG. 4 and shows the hole 200, partially filled with a region of loosely woven fabric, comprising wide, thin weft so chosen to provide discrete cover for the wearer while minimizing separation between the magnetic regions 410 and 420, or 300 and 115 respectively as the case may be. The weave further leaves substantial spaces in which the magnetic and metallic regions may be kept in close contact to exert stronger force, since magnetic attraction drops of as the inverse cube of the distance separating two magnetically active elements. The loosely woven area serves also to preserve as much as possible the mechanical effectiveness of retaining the display by mechanical fastening means 140 as disclosed herein. In this way the garment retains its value even when used without the display, while providing a useful rugged combination of mechanical and magnetic retention when used with the display. For best advantage the illustrated mesh patch should be permanently fixed to the garment in such a way as to exactly cover the area of removed fabric, if any.

Figure 7:
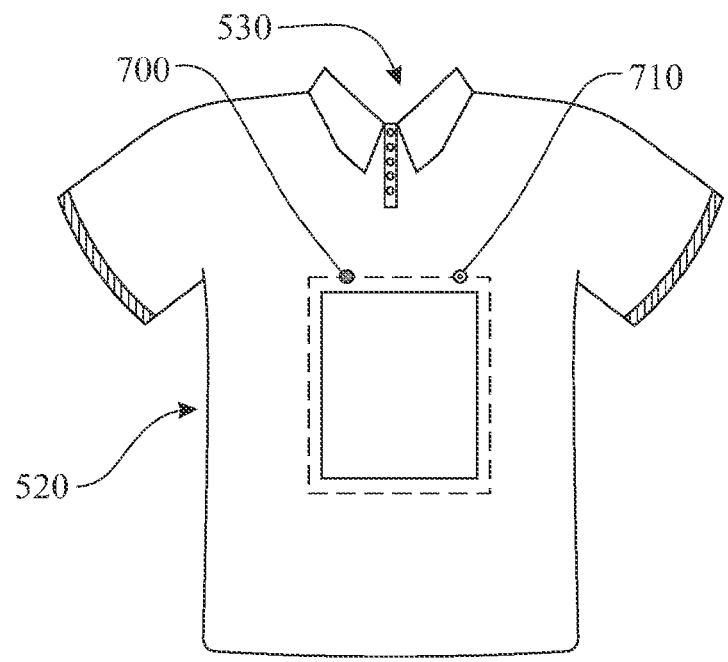
FIGS. 7-8 show embodiments of the present invention such as optional other connected, associated LED display areas FIG. 9 show embodiments of the present invention such as the optional hood-rimming LED display area
Figure 8:
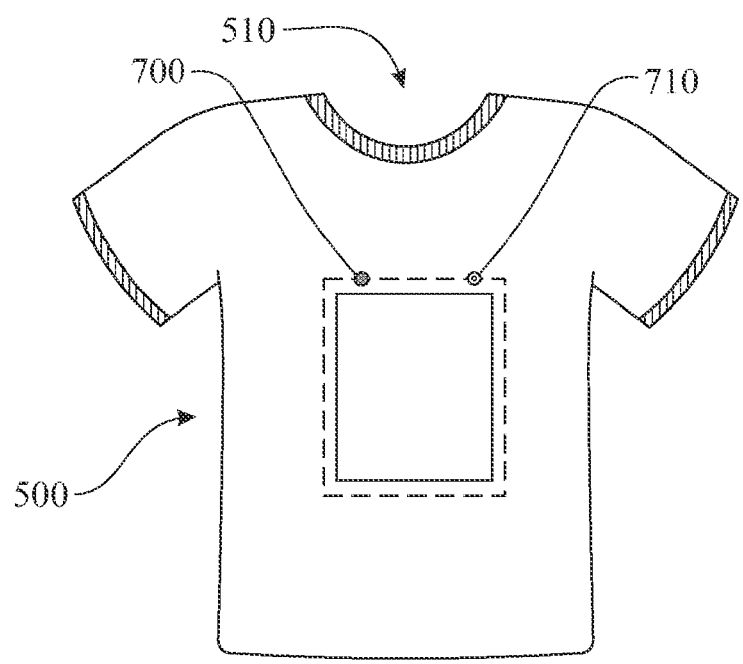

The drawings of FIGS. 7-8 show embodiments 500, 520 of the present invention such as optional other connected, associated LED display areas 510.

Figure 9:
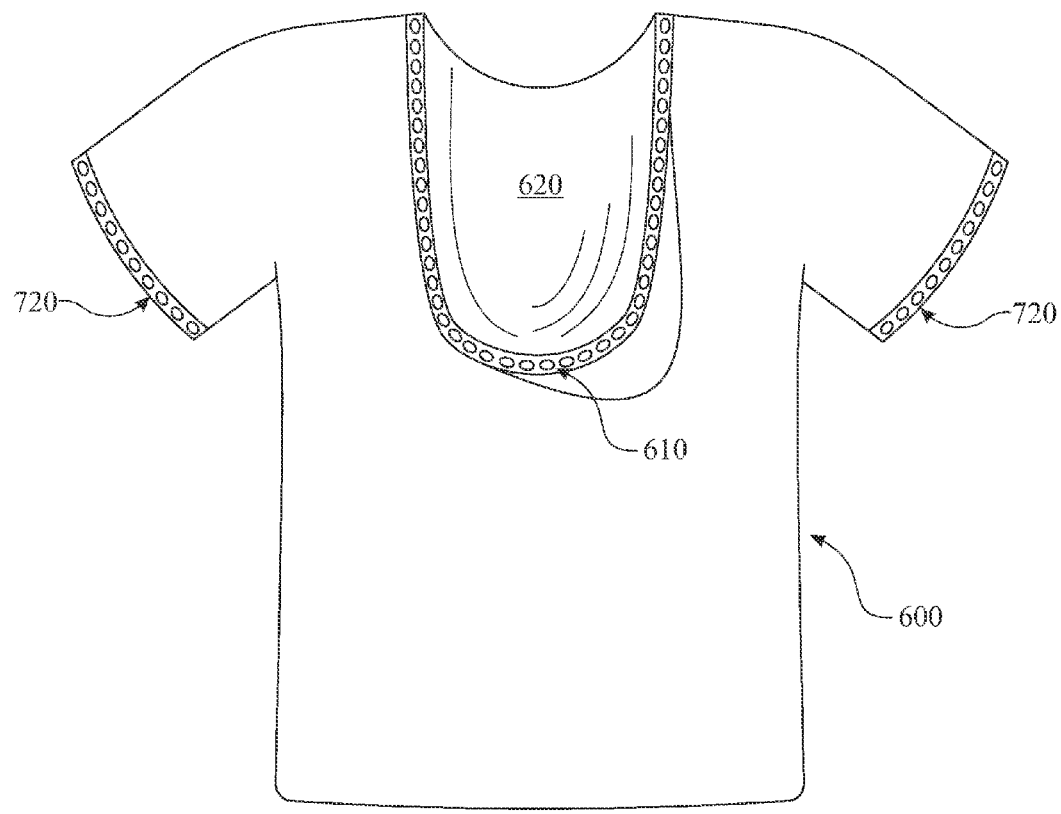

In turn, FIG. 9 shows an embodiment in rear view of the present invention as a hooded sweatshirt 600 with LED display area 610 rimming hood 620.

The illustrations of FIGS. 10 A and D show opposing magnetic surfaces 410, 420 which are laid out in such a way that opposite magnetic poles of permanent magnets attract to align when brought together and retain the display assembly 110 of FIG. 1, and backing sheet 300 of FIG. 6. Enlarged views are provided in FIGS. 10 B and C, showing details of magnetic polarity distribution and alignment. Drawings are not to scale. It should be understood that magnets add mass, which is not desirable in this invention as discussed above. Magnets thus would be made as thin and light, as small and as widely spaced as possible.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A wearable display system comprising:
a garment;
a display screen;
fastening means for removably attaching the display screen to said garment,
wherein the garment comprises a rectangular hole of substantially an identical size to said display screen and a substantially opaque rectangular patch sewn into said garment at a time of manufacture of said display screen, filling said hole,
wherein the display screen is attached on the opaque rectangular patch;
a digital electronics section comprising a memory for storing images or parts of images and a processor connected to the memory, wherein the processor is capable of retrieving images from the memory and of displaying said images on the display screen.

2. The system of claim 1, wherein said display screen comprises a flexible display screen.

3. The system of claim 1, further comprising a USB and/or SPI port for accepting images to be displayed or information pertaining to stored images from an external source, wherein the processor is connected to and capable of retrieving images from the USB and/or CPI port and of displaying said images on the display screen.

4. The system of claim 1, wherein the digital electronics section further comprises digital circuitry providing wired or wireless communication with an external mobile terminal or external device, and the processor is adapted to receive information pertaining to images to be displayed from said external mobile terminal or external device.

5. The system of claim 4, further comprising said external mobile terminal or external device.

6. The system of claim 1, further comprising an operating system, a graphic user interface and a graphic card.

7. The system of claim 1, further comprising garment-mounted LED display areas external to the display screen and connected to the processor.

8. The system of claim 1, wherein said fastening means comprise mechanical fasteners for attaching the display screen or regions rigidly fixed to the display screen to corresponding parts on the garment.

9. The system of claim 1, wherein said fastening means comprise magnetic attachment means for attaching the display screen or regions rigidly fixed to the display screen to corresponding parts on the garment.

10. The system of claim 9, wherein the magnetic attachment means comprise fine particulate matter having magnetic properties, said fine particulate matter being mixed into the display screen, into regions rigidly fixed to the display screen, and/or into corresponding parts of the garment at time of manufacture of said display screen, said regions rigidly fixed to the display screen, and/or said corresponding parts of the garment.

11. The system of claim 9, where the magnetic attachment means comprises discrete elements having magnetic properties.

12. The system of claim 1, wherein said fastening means retains functionality upon immersion in water.

13. The system of claim 1, further comprising a lightweight microphone and/or speaker and a miniature lightweight camera.

14. A method of conveying digital content on a wearable display system, the method comprising:
attaching a removable display screen to a garment, wherein said garment comprises a rectangular hole of substantially an identical size to said display and a substantially opaque rectangular patch sewn into said garment at a time of manufacture of said display screen, filling said hole;
wherein said display screen is attached on said opaque rectangular patch;
interacting with a network by a digital electronics section;
storing images or parts of images in a memory of said digital electronics section;
processing images from said memory;
and updating the digital content displayed on said display screen in accordance to the network interaction, the storing and the processing.

15. The method of claim 14, further comprising the step of:
receiving digital content containing images content captured by choice of the user of the wearable display system.

16. The method of claim 14, further comprising the step of:
obtaining said digital content by browsing the network, purchasing from the network or reading from a storage medium in the network.

17. The method of claim 14, wherein said network is accessed by participants in an activity, the method further comprising the steps of:
distributing to at least a portion of said participants wearable display systems, each having a display screen affixed thereto;

sending activity-related information to the network from the wearable display system of at least one participant;

updating the digital content displayed by the display screens of the participants' wearable display systems in accordance to said activity-related information.

18. The method of claim 17 wherein said activity comprises a team sport wherein said participants are organized into two opposing teams and wherein said activity-related information identifies team membership of said participants.

19. The method of claim 17 wherein said activity comprises an emergency procedure, and wherein said activity-related information is selected from the list of indicating an evacuation or lockdown destination of said participants or identifying rank or security level of said participants.

* * * * *